United States Patent [19]
Lambert, Sr.

[11] 3,827,586
[45] Aug. 6, 1974

[54] VEHICLE TOWING AND JACKING DEVICE
[75] Inventor: Russell R. Lambert, Sr., Trenton, Tex.
[73] Assignee: Warren K. Boney, Dallas, Tex.; a part interest
[22] Filed: Mar. 15, 1971
[21] Appl. No.: 124,104

[52] U.S. Cl............................ 214/86 A, 254/139.1
[51] Int. Cl.............................................. B60p 3/12
[58] Field of Search....... 214/86 A; 280/414 R, 402; 254/139.1

[56] References Cited
UNITED STATES PATENTS

| | | | |
|---|---|---|---|
| 3,142,494 | 7/1964 | Kelley | 280/414 R |
| 3,152,704 | 10/1964 | Russell | 214/86 A |
| 3,283,927 | 11/1966 | Ankeny | 214/86 A |
| 3,415,397 | 12/1968 | O'Banion | 214/86 A |
| 3,486,650 | 12/1969 | Boone | 214/390 |
| 3,490,627 | 1/1970 | Goldston, Jr. | 214/86 A |
| 3,510,016 | 5/1970 | Wolff et al. | 214/86 A |
| 3,559,827 | 2/1971 | Schier | 214/86 A |
| 3,627,154 | 12/1971 | Troup | 214/86 A |

Primary Examiner—Albert J. Makay
Attorney, Agent, or Firm—Peter J. Murphy; Cecil L. Wood

[57] ABSTRACT

For towing a disabled vehicle with another vehicle such as a pickup truck or passenger automobile, a towing device is in the form of a two wheel trailer coupled to the towing vehicle through a conventional ball and socket hitch with the trailer including a hydraulic jack for lifting one end of the disabled vehicle from the pavement. The trailer includes a forwardly inclined track, a carriage raised and lowered on the track by means of the hydraulic jack, and belt and chain coupling assemblies for securing one end of the disabled vehicle to the carriage. The trailer includes a third wheel which can be lowered to operative position for use of the trailer as a self contained jacking device in a service area.

13 Claims, 9 Drawing Figures

INVENTOR
Russell R. Lambert, Sr.

BY
ATTORNEYS

INVENTOR
Russell R. Lambert, Sr.

INVENTOR
Russell R. Lambert, Sr.

BY

ATTORNEYS

INVENTOR
Russell R. Lambert, Sr.

BY

ATTORNEYS

VEHICLE TOWING AND JACKING DEVICE

BACKGROUND AND SUMMARY OF THE INVENTION

This invention relates to a towing device in the form of a trailer for towing a disabled vehicle by means of another conventional vehicle, and more particularly to such a device which may also function independently as a jacking device.

For persons engaged in the servicing of passenger automobiles and other vehicles, such as operators of service stations or of small service or repair garages, it is desirable to have some form of service vehicle for towing damaged or otherwise disabled vehicles from the point of disablement back to the service location. Vehicles are available, of course, which are designed for towing automobiles and which are conventionally provided with lift means for raising one end of the disabled vehicle so that it may be towed to the service locations. Such towing vehicles, sometimes referred to as "wreckers", are quite expensive and, additionally, are single purpose vehicles having little practical use. General purpose trucks, for example. Considering the relative expense of such vehicles and the relative limited utility in terms of time use, it is simply not practical for the small operator to employ such units.

Where the operation is somewhat larger and could support such a single purpose vehicle, occasions may arise where more than one vehicle is needed, particularly where the single vehicle is not available due to breakdown or to use at a distant location.

Accordingly, it is desirable to provide a towing unit or device which is available to small service station or garage operators at a reasonable price for the towing of disabled vehicles from the breakdown location to the service location. It is further desirable that such a towing device be adapted to be towed by a general utility vehicle such as a pickup truck or panel truck, which is also useful for other purposes in connection with a service operation. In view of the relatively limited or irregular call for the actual towing of disabled vehicles, it is desirable that the towing device be adapted for use for other purposes such as general lifting or jacking operations in a service area.

A principle object of this invention is to provide an improved rugged and safe towing device in the form of a trailer for towing a disabled vehicle with a towing vehicle such as a pickup truck or passenger automobile which is not primarily designed for that task.

Another object of this invention is to provide such a towing device which is extremely convenient to use, safe in operation, and obviates damage to the towed vehicle.

A further object of this invention is to provide such a towing device which is readily adapted for use as a jacking device in a service area independent of the towing vehicle.

These objects are accomplished in a device having a generally horizontal chassis, with a pair of load supporting wheels at the rearward end and a vertically adjustable wheel at the forward end. Means is also provided at the forward end for coupling the device to a towing vehicle. An inclined track extends upward and forward from the rearward end of the chassis and carries a slideable carriage which is raised and lowered on the track by lift means mounted on the device. The carriage includes coupling means for attachment to one end of the towed vehicle.

The novel features and advantages of the invention, as well as additional objects, will be understood more fully from the following description when read in connection with the accompanying drawings.

DRAWINGS

DESCRIPTION OF THE PREFERRED EMBODIMENT

Figure 1:
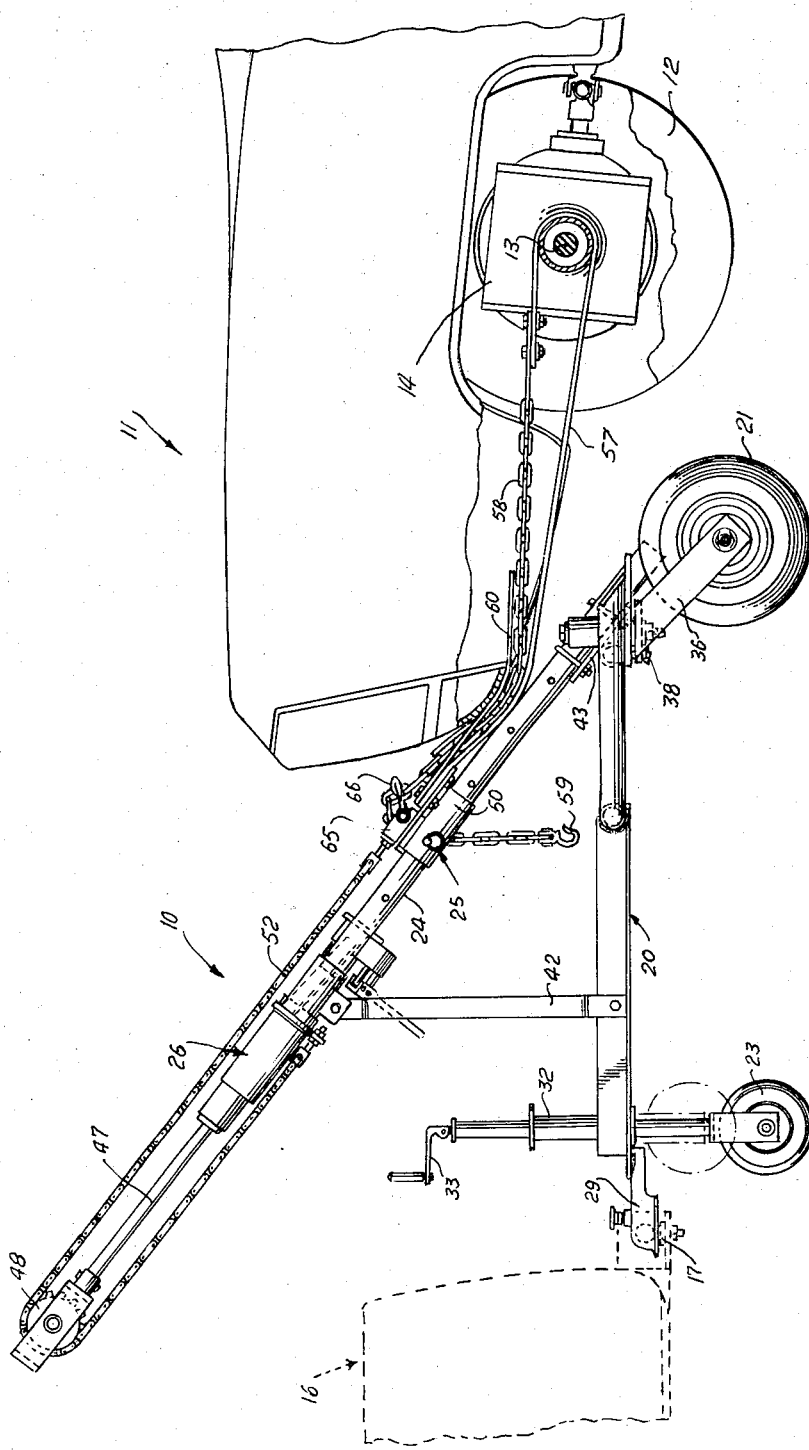
FIG. 1 is a side elevation view of a device according to the invention showing, fragmentarily and partially broken away, the rearward end of a disabled vehicle lifted off the pavement, and also showing in broken lines the rearward end of a towing vehicle.
Figure 2:
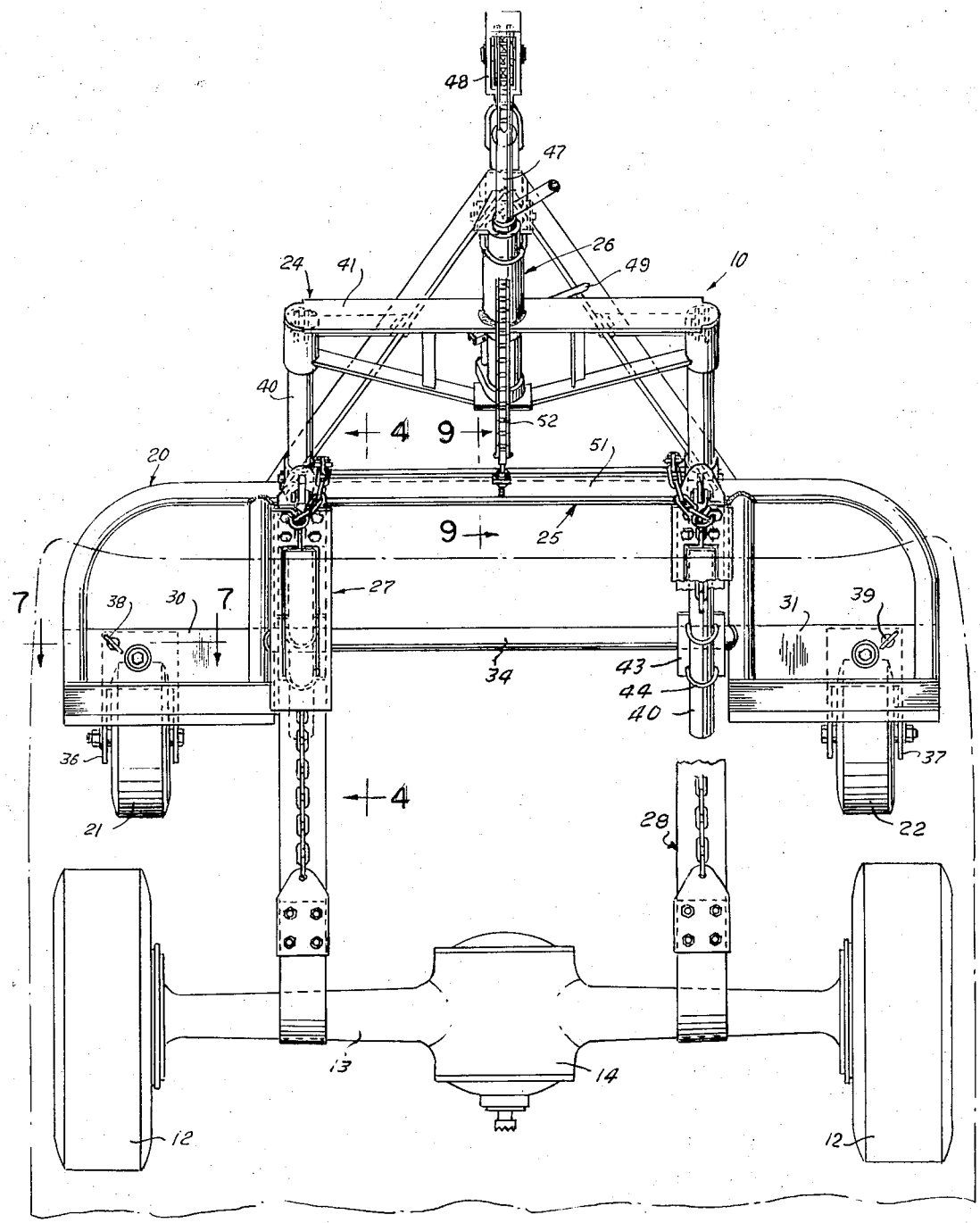
FIG. 2 is a plan view of the device of FIG. 1 showing an outline of the towed vehicle, fragmentarily in broken lines, and showing the coupling of the device to the rear axle of the towed vehicle.
Figure 3:
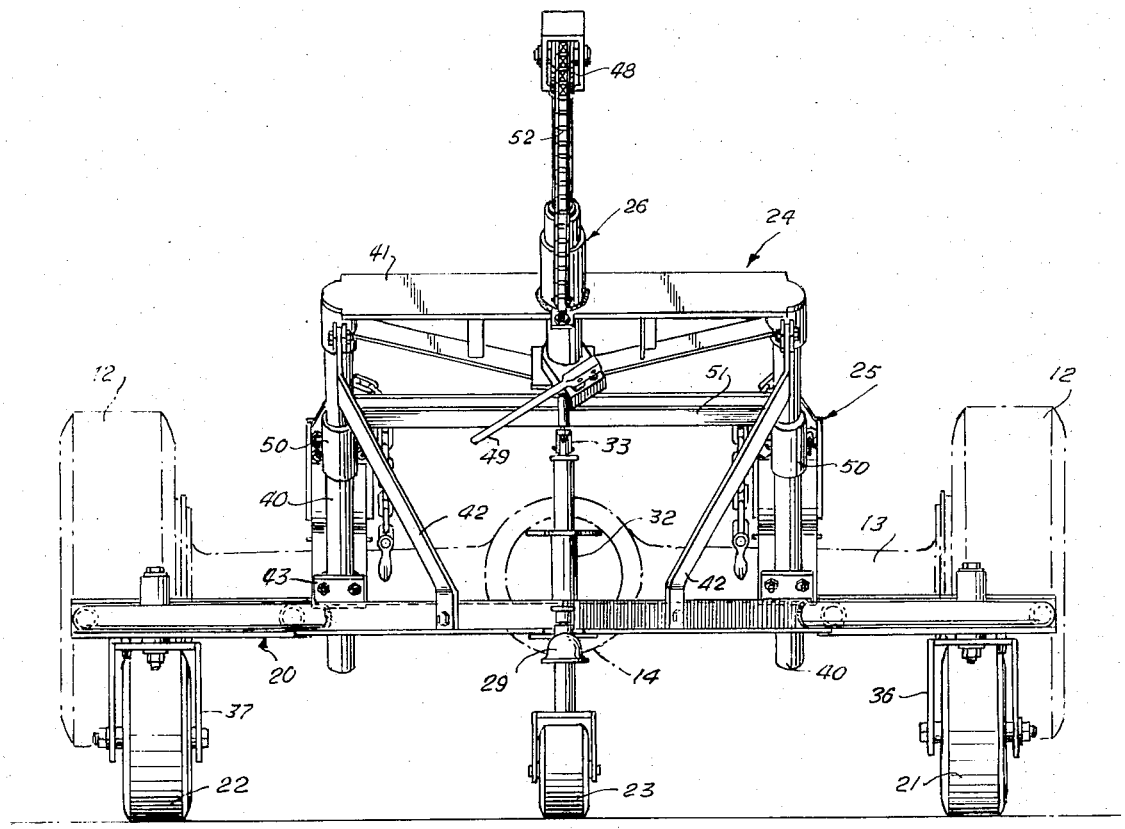
FIG. 3 is a front elevation view of the device of FIG. 1, showing the raised axle and wheels of the towed vehicle in broken lines.
Figure 4:
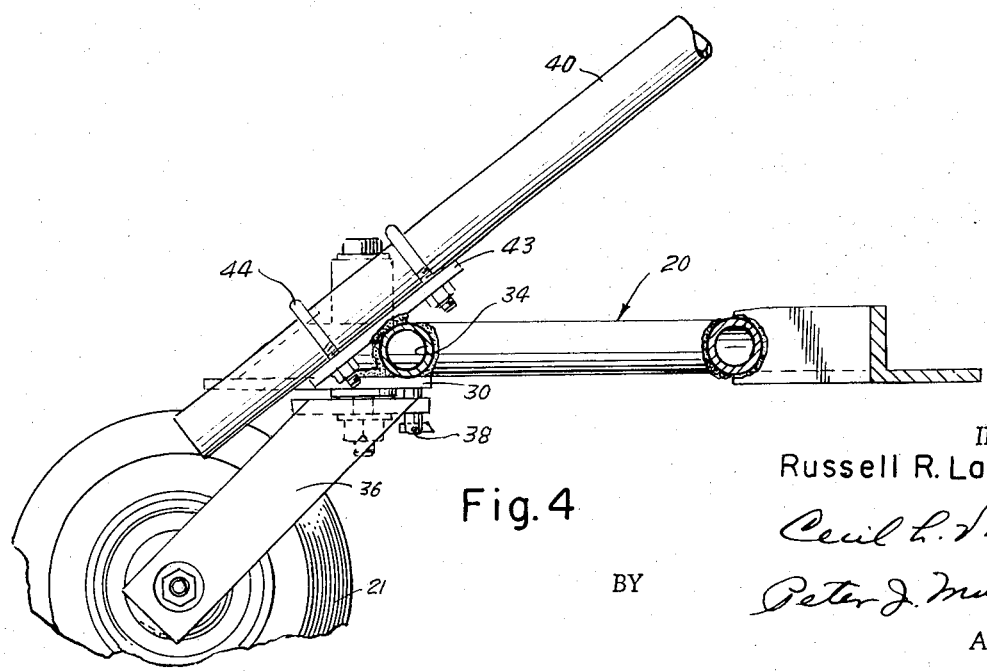
FIG. 4 is a fragmentary side elevation and sectional view taken in the plane 4—4 of FIG. 2.

FIGS. 1, 2 and 3 of the drawing are general views of the towing and jacking device 10. In general, the jacking device includes a horizontal frame or chassis 20, which is supported on two rear, load bearing wheels 21 and 22 and one front support wheel 23. An inclined track 24 extends upwardly and forwardly from the rear end of the chassis and supports a carriage 25 which is raised and lowered along the track by means of a hydraulic jack 26 supported at the upper end of the track. A pair of belt-chain coupling assemblies 27 and 28 are secured to the carriage 25 for coupling or securing to the carriage the vehicle which is to be towed or jacked. A socket element 29, of a conventional ball and socket hitch, is secured to the forward end of the chassis for coupling the device to a towing vehicle. When the device is coupled to a towing vehicle, the front support wheel 23 is raised from the pavement.

In FIG. 1, the rear end of a passenger automobile 11 is shown fragmentarily, as a towed vehicle, with other illustrated parts including rear wheels 12 and axle 13, and the differential 14. Portions of towed automobile 11 are also shown in FIGS. 2 and 3. It will be understood, of course, that the device is equally well adapted to raise up the front end of an automobile for use with a truck.

In the figures, the front wheel 23 is shown in the lower pavement engageing position wherein the device 10 is used simply as a jacking device for raising the end of disabled vehicle as shown. When used as a towing trailer, the device is coupled to a towing vehicle; and FIG. 1 illustrates the rear end of a pickup truck 16 having a conventional trailer hitch socket 17 mounted thereon. When used as a towing device, the front support wheel 23 is raised to the broken line position as indicated in FIG. 21.

Referring to the structure of the device in more detail, the chassis 20 is a welded assembly of tubular steel and angle steel members, including load wheel supporting pads or plates 30 and 31 at the rear corners. A screw jack 32 rigidly attached to the forward end of the chassis carries the front supporting wheel 23 in the manner that the wheel may be raised and lowered relative to the chassis by means of a jack operating crank 33. The chassis also includes a rear transverse support bar 34 which extends generally between the wheel pads 30 and 31.

The rear main wheels 21 and 22 are rotatively supported in respective swivel frames 36 and 37 which are in turn rotatively supported about vertical axes on the respective wheel pads 30 and 31. The main support wheels are, then, swivel wheels; however, the wheel pads and swivel frames are provided with aligned holes adapted to receive locking pins 38 and 39 for the purpose of selectively locking the swivel wheels in the position illustrated in the drawings. The front support wheel may also be mounted for pivotal movement relative to the chassis.

The track 24 is made up of parallel tubular rails 40 supported in spaced relation at the upper forward end by a head structure 41 preferably fabricated of welded steel members. The head structure is supported above the forward end of the chassis 20 by means of upright braces 42, secured to the chassis and head structure by means of suitable bolts, for example. At the rearward end of the device 10, the rails 40 overlie and extend beyond the chassis support bar 34. The support bars are provided with spaced support pads 43 in the form of steel plates welded to the bar; and the rails 40 are secured to the support pads 43 by means of threaded U bolts, overlying the rails and extending downwardly through suitable holes provided in the pads and being anchored by suitable nuts. In this manner the rails 40 are detachably secured to the chassis 20.

The body of a conventional hydraulic jack 26 is rigidly mounted in the head structure 41 with the axis of the jack cylinder being aligned parallel to and disposed between the rails 40, and with the extensible plunger 47 of the hydraulic jack extending forwardly relative to the head structure. A roller chain sprocket wheel 48 is rotatively supported at the end of the plunger about a transverse axis.

Figure 9:
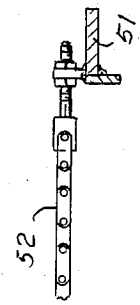
FIG. 9 is a fragmentary detailed view illustrating the attachment of the lift roller chain to the lift carriage.

The carriage 25 includes a frame made up of parallel end sleeves 50 and a transverse interconnecting bar 51, these numbers being preferably welded together. These sleeves 50 are dimensioned to enclose the rails 40 in siding relations so that the carriage is moveable along the inclined track 24. For raising and lowering the carraige 25 a roller chain 52 has one end anchored to the head structure 41, as best seen in FIG. 1, extends upwardly and forwardly over the chain sprocket 48, then downwardly and rearwardly to a point of attachemnt to the carriage frame bar 51 between the sleeves 50. The roller chain may be adjustably secured at either end in the manner shown shown in FIG. 9. It will be seen then that the carriage 25 is raised along the track 24 by extending the hydraulic jack plunger 47, and the carriage is lowered by permitting the plunger to receed into the jack cylinder.

Figure 5:
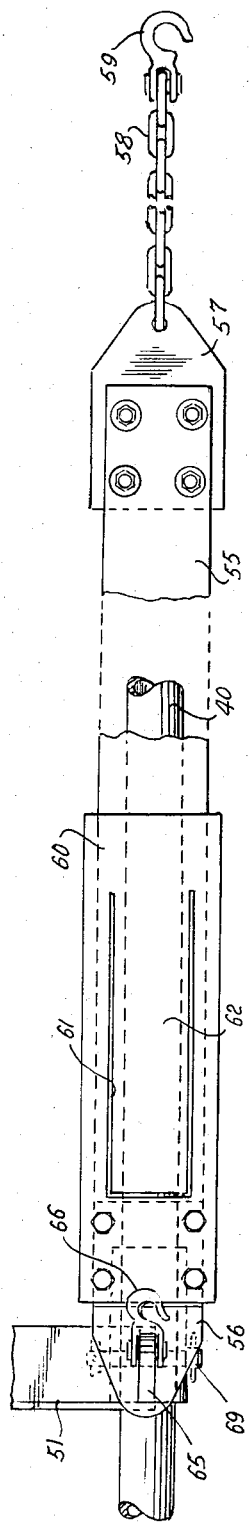
FIG. 5 is a fragmentary and broken plan view of the belt and the chain assembly for coupling the towed vehicle to the lifting carriage.
Figure 6:
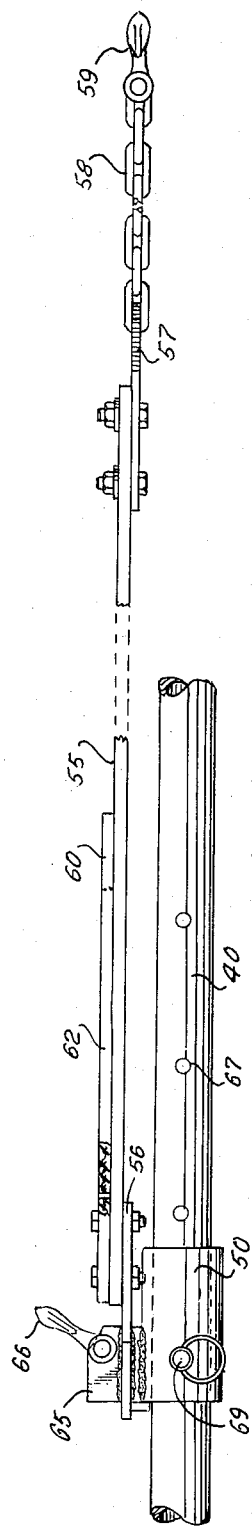
FIG. 6 is a fragmentary and broken view of the assembly of FIG. 5 as viewed as from the side.

The coupling assemblied 26 and 27 for coupling a towed vehicle to the device 10 are best shown in detail in FIGS. 5 and 6. As seen in these figures, each coupling assembly includes a load belt 55 having a carriage anchor plate 56 and a chain anchor plate 57 secured to the belt at opposite ends by means of bolts for example, and a log chain 58 is secured to the chain anchor plate 57 with a hook 59 being provided at the remote end thereof.

An elongated protective belt or pad 60 overlies the load belt 55 and is secured at its forward end to the carriage anchor plate 56 in sandwich relation with the load belt. This protective belt 60 is cut to define an opening 61, through which the log chain may pass as will be described, and a coincident flap 62 which is joined adjacent to the rearward end of the belt overlying the opening 61.

As best seen in FIG. 6, each of these sleeves 50 is provided with an upwardly extending boss 65 which is generally rectangular in cross section as viewed from the top. The above described load belt anchor plates 56 are provided with rectangular openings deminsioned slightly larger than the bosses 65 so that these plates may be slipped over the bosses to anchor the coupling assemblies to the carriage. The bosses 65 are provided with transverse holes to which are secured respective log chain hooks 66 which, when assembled to the bosses, serve to retain the anchor plates 56 on the carriage and also serve to anchor the log chain 58 as will be described.

The manner of securing the disabled vehicle to the towing and jacking device is best illustrated in FIGS. 1 and 2. For this operation the carriage 38 would be in its lowermost and rearward most position wherein its height would be approximately that of the lower portion of the frame of the automobile 11. The coupling is accomplished by threading the belt chain coupling assembly under and over the vehicle axle 13 as seen in the drawings. The load belts 55 are preferably of a length to extend around the rear axles of the vehicles and therefore obviate any damage to the axles which might have resulted if the log chain portion of the assembly were engaging the axles. The log chain 58 is then passed forwardly overlying the forward end of the load belt 55 and passing under the rearward end of the protective belt 60 and upward through the opening 61. The flap 62 is lifted to permit passage of the log chain and to provide the protective cover of the log chain to a point very close to the log cabin hook 66 to which the log chain is secured. When the log chains for both coupling assemblies 27 and 28 are so strung the device 10 may be moved against the vehicle 11 to be supported and the slack in the chains can be taken up and the chains relatched in the respective hooks 66. The protective belt 60 always provides a proctective layer between the log chain and the vehicle body, as best seen in FIG. 1 to prevent any damage to the vehicle body.

It will be noted in FIG. 1 that the lifting load is carried by the jacking device 10 at the point where the rearward end of the vehicle body is engaged by the carriage coupling assemblies. It will be seen that this lifting point, even at the beginning of the lifting operation, is either above or slightly forward of the axes of the load wheels 22 and 23 so that the load will not tend to pivot the device 10 about these wheel axes at the beginning of the lifting operation. This is important in a jacking operation wherein the front end of the device is not anchored to a towing vehicle, for example. Of course, as lifting progresses, the load is shifted forwardly and is always carried at a transverse line between the rear load wheels and the front support wheel or hitch point. Even in the raised or towing position of the towed vehicle, as seen in FIG. 1, for example, the load carrying point is close to the rearward end of the device so that substantially all of the load is carried by the main load wheels 21 and 22.

Figure 8:
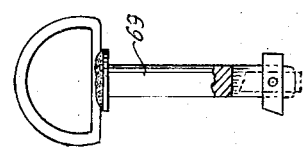
FIG. 8 is a detail view of a safety locking pin used with the carriage assembly as seen in FIG. 6, and of the type used in the load wheel assembly of FIG. 7.
Figure 7:
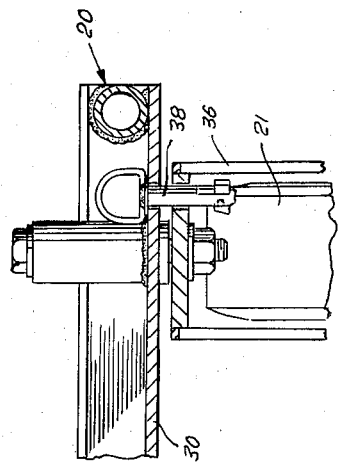
FIG. 7 is a fragmentary sectional view of a support wheel assembly taken in the vertical plane 7—7 of FIG. 2.

The rails 40 are provided with longitudinally spaced sets of transverse holes 67, each set being preferably inclined at a slight downward angle relative to the plane of the chassis; and each sleeve is provided with a set of holes disposed for alignment with respective rail holes at several positions of the carriage along the track. Safety lock pins 69, of the type particularly shown in FIG. 8, may be inserted through the aligned holes to prevent carriage movement due to hydraulic leak, for example.

OPERATION

The operation will now be briefly described in connection with a jacking use in a service station or garage service area, where the device is used merely to raise one end of the vehicle for service work on the vehicle. For this use the front wheel 23 is lowered to the supporting position shown in FIGS. 1 and 2 by means of the screw jack 32. The chassis 20 is then supported in a generally horizontal plane as indicated. The rear wheels 21 and 22 are preferably locked in the position shown by inserting the locking pins 38 and 39 in the respective aligned holes provided in the wheel pads 30 and 31 and wheel swivel frames 36 and 37. With the load wheel locked, the device may be more readily moved into position adjacent to the end of the vehicle to be lifted.

The carriage 25 is assumed to be in the lowermost position as determined by the roller chain adjustment when the hydraulic jack plunger is fully receeded. The coupling assemblies 27 and 28 are then threaded over the axle 13 of the vehicle and through the openings 61 of the protective belt 60 as described.

The jacking device 10 is then urged snugly against the end of vehicle with the slack being taken up in the log chains, and the log chains are latched in the log chain hooks 66.

The vehicle is then in a condition to be raised on the jacking device and this is accomplished by actuating the hydraulic jack operating handle in a normal manner to extend the jack plunger 47 to raise the carriage 25 along the rails 40 to the raised position shown in FIG. 1 for example. The raised vehicle 11 is then secured to the device in a safe manner; however, to prevent an inadvertent lowering of the vehicle due to hydraulic leakage in the jack 26, the safety lock pins 69 may be inserted in respective aligned holes in the carriage sleeves and track rails.

If is is desired to move the supported vehicle 11 within the service area, it may be desirable to remove the wheel locking pins 36 and 37 to permit swiveling of the load wheels 21 and 22.

For lowering the supported vehicle 11, the safety lock pins 69 are removed from a locking position; and the hydraulic jack is controlled in the usual manner to release the hydraulic fluid supporting the plunger 47 and permitting the carriage 25 to lower under the weight of the supported vehicle and carriage.

For a towing operation, the towing device 10 is coupled to a towing vehicle such as a pickup truck 16 through the conventional ball and socket hitch 17, 29. The front wheel 23 is then raised from engagement with the pavement by the screw jack 32, with the hitch maintianing the chassis 20 in the generally horizontal position shown.

For pulling the towing device 10 to the location of the disabled vehicle, the load wheels 21 and 22 are locked in the indicated position by the respective locking pins to prevent fishtailing of the device. The coupling assemblies 27 and 28 must of course be secured, and the log chain hooks 66 and hooks 59 at the ends of the log chain are used for this purpose.

At the site of the disabled vehicle 11, the towing device 10 is maneuvered into position for coupling to the vehicle in the manner previously described except that the maneuvering is now done with the towing vehicle, and the disabled vehicle is secured to the carriage 25 through the coupling assemblies 27 and 28 as described. Again, the free ends of the log chains 58 are suitably secured to prevent dragging on the pavement.

The coupled end of the disabled vehicle is raised on the towing device in the manner described; and the safety lock pins 59 are inserted to secure the carriage while the vehicle is towed to the service area.

Since the towed vehicle 11 is secured in a substantially rigid or nonpivotal manner to the towing device 10, the load wheels 21 and 22 must be released for service movement to permit turning of the coupled towing vehicle, towing device and towed vehicle. Accordingly, the wheel locking pins 38 and 39 are removed from the respective wheel pads and swivel frames and suitably secured on the device to prevent loss. During the towing, the weight of the supported vehicle 11 is carried principally on the main load wheels 21 and 22 of the device.

What has been described is a device which is particularly useful to a service station or small repair garage operation from the stand points of both versatility and economy. The device is a rugged and safe towing device for use with a general utility vehicle such as a pickup truck which such a service station or garage owner would normally have for use in his business. The device is also independently useful as a lifting jack when it is not needed for vehicle towing purposes. A particular feature of the device is its versatility and adaptability to either of these uses.

In a jacking use the device is very safe to use since the load of the supported vehicle is always carried between the supporting wheels. The vehicle is coupled to the jacking device in a very secure manner, through described coupling assemblies; and additionally, the safety locking pins are provided to prevent inadvertent lowering of the vehicle. This rugged and safe securing of the vehicle to the device is also important, of course, for the towing position.

Another feature of the device is the ease with which it is converted from a towing use to the jacking use. Still another feature of the device is the provision for alternative swiveling or locking of the main support wheels if desired for the several desired operations.

An additional feature is the manner of mounting the track on the chassis so that it is readily removed for repair if necessary, or so that the carriage may be readily removed from the rails for repair of the carriage, for example. Additionally, the coupling assemblies 27 and 28 are designed for ease of repair or replacement. Still another feature of the device is the design of the coupling assemblies for preventing damage to the vehicle through the use of the device either in a jacking or towing operation.

While a preferred embodiment of the invention has been illustrated and described, it will be understood by those skilled in the art that changes and modifications may be resorted to without departing from the spirit and scope of the invention.

What is claimed is:

1. A device for lifting and towing vehicles comprising a generally horizontal chassis supported on a pair of laterally spaced wheels at the rearward end;
 elongated track means mounted on said chassis and inclined upwardly and forwardly from the rearward end thereof;
 a carriage slideably mounted on said track means for movement therealong;
 power lift means coupled to said carriage, to raise and lower the carriage on said track means;
 a pair of elongated flexible coupling assemblies, each including a belt portion of a flexible nonabrasive material and a log chain portion; an upwardly projecting boss at each side of said carriage for securing the belt end of one coupling assembly thereto, the belt end of each assembly including an aperture means dimensioned to receive said boss for engagement therewith;
 a log chain hook mounted on each of said bosses for retaining a respective belt aperture means thereon, and for selectively securing thereto the log chain end portion of the respective flexible assembly;
 said coupling assemblies being thereby adapted to be looped around transverse underframe members of vehicle to be lifted and to be adjustably secured to said carriage, whereby the vehicle is rigidly secured to said carriage.

2. A device as set forth in claim 1
wherein each of said coupling assemblies includes an elongated resilient protective pad secured to the belt end thereof and overlying said belt end portion;
said protective pad incuding an opening adjacent to the attached end thereof and a hinged flap in said opening extending toward the attached end thereof; said flap being disposed to overlay the log chain portion passed through said opening for engagement with a respective log chain hook.

3. A device as set forth in claim 1
wherein said coupling assembly belt portion includes a latch plate at its free end defining said aperture means;
an elongated protective pad being secured to said belt portion latch plate and overlying the belt portion;
said pad being provided with an elongated opening adjacent to said latch plate, and a hinged flap in said opening being hinged at the end remote from said latch plate; and said pad being disposed to overlay the log chain passing upwardly through said opening for engagement with the log chain hook.

4. A device as set forth in claim 1
including at least one support wheel mounted at the forward end of said chassis;
and means for vertically adjusting said forward wheel relative to said chassis.

5. A device as set forth in claim 1
wherein said track means includes a pair of parallel side rails; wherein said carriage includes a pair of laterally spaced rail engaging side members and a transverse interconnecting member; and wherein said bosses on said carriage for connecting the belt and chain ends of said flexible assemblies overlie said rail engaging side members.

6. A device as set forth in claim 5
wherein said side rails are tubular members; wherein said carriage side members are sleeve members enclosing said tubular rails;
said tubular rails being provided with longitudinally spaced sets of holes; said carriage sleeve members each being provided with a set of transverse holes disposed to be aligned with selected sets of rail holes;
and safety pin means dimensioned to be secured and latched in aligned holes for securing the carriage against movement on said track.

7. A device as set forth in claim 5
wherein said track means includes a frame at its upper end connecting said rails;
generally vertical brace means detachably attached to said chassis and said track frame for supporting the forward end of said track means;
and detachable coupling means for securing the rearward ends of said track rails to said chassis.

8. A device as set forth in claim 1
said power lift means comprising jack means having an extensible plunger mounted on said chassis; and means coupling the extensible plunger of said jack means to said carriage to raise and lower the carriage on said track means.

9. A device as set forth in claim 8
wherein said track means includes parallel side rails and an upper interconnecting frame;
said jack means being mounted on said track frame and disposed to extend its plunger forwardly and parallel to said track rails; wheel means rotatably supported on the forward end of said jack plunger;
and a flexible tension member threaded over said wheel means, having one end connected to said track frame and having the other end connected to said carriage.

10. A device as set forth in claim 9
wherein said jack means is a hydraulic jack; wherein said flexible tension member is a roller chain; and wherein said jack wheel means is a roller chain sprocket.

11. A device as set forth in claim 1
said elongated track means being inclined at a relatively shallow angle of elevation upward and rearward from said wheels at the rearward end, whereby the vehicle load carried by said carriage is positioned forwardly of the rear wheel axes.

12. A device as set forth in claim 11
said angle of elevation being approximately 35°.

13. A device as set forth in claim 1 said coupling assemblies securing the vehicle to said device in a relatively rigid, unyielding coupling; said laterally spaced rearward wheels being caster-type wheels mounted for swivel movement about vertical axes relative to said chassis; and coacting means associated with said chassis and said wheels for selectively locking said wheels in a rearward pivoted position with the wheel axes aligned on a common axis.

* * * * *